United States Patent Office 2,799,917
Patented July 23, 1957

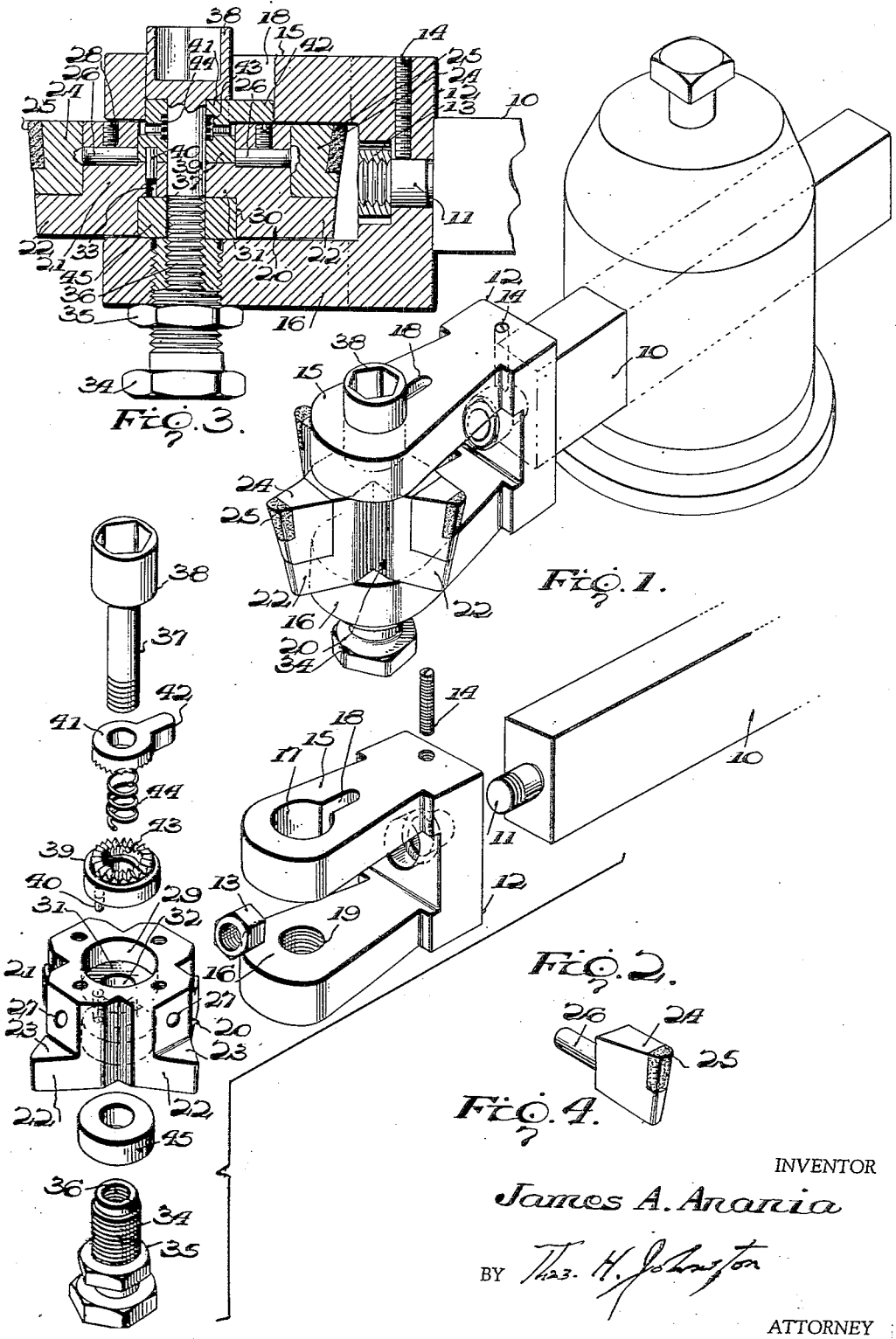

2,799,917

CUTTER TOOL ASSEMBLIES

James A. Anania, Newark, N. J., assignor of one-half to William J. Matt, Jr., Upper Montclair, and one-tenth to Frederick L. Knecht, Glen Rock, N. J.

Application June 28, 1954, Serial No. 439,613

3 Claims. (Cl. 29—98)

This invention relates to an improved cutter tool assembly.

More particularly, the invention pertains to cutting tools of the character employing a tool holder having a rotatably adjustable cutter head thereon fashioned to carry a number of cutters which, by adjusting the head, may be selectively disposed in position for use. Experience has shown that, in a tool of this character, it is imperative to solidly lock the head in adjusted position, else the head will give more or less minutely under the strain of the cutting operation and cause the cutter to spoil the work.

It is therefore an object of the present invention to provide an improved locking mechanism for the cutter head of the tool which will function to effectively lock the cutter head solidly in adjusted position.

A further object is to provide a locking mechanism which may be quickly and easily released to free the cutter head for rotatable adjustment, and as quickly and easily tightened to again lock the cutter head in adjusted position, so that, in practical use, change from one cutter to another may be made without inconvenience or excessive loss of time.

And the invention has, as a still further object, to provide a tool wherein the fork of the tool holder may, in order to meet the demand of the work to be cut, be adjustably rotated upon the shank of the holder for tilting the cutter head and consequently, the cutter in use, and wherein the cutter head may be reversed side for side upon said fork.

Other and incidental objects will appear as the description of the invention proceeds, and in the drawings:

Figure 1 is a perspective view showing my improved assembly in conjunction with a conventional tool post.

Figure 2 is a perspective view showing the parts separated but in proper relative position.

Figure 3 is a vertical section through the cutter head and associated parts.

Figure 4 is a perspective view of one of the cutters.

In carrying the invention into effect, I employ a tool holder embodying a shank 10 oblong in cross section, and formed on said shank at its forward end is a stud 11. Rotatably adjustable upon the stud 11 is a fork 12 retained by a nut 13 screwed on said stud, and extending through the fork from one side thereof is a set screw 14 disposed to engage said stud for securing the fork in adjusted position.

The fork 12 is provided with parallel arms 15 and 16 respectively, and for convenience of description, the arm 15 will be considered as the upper arm while the arm 16 will be considered as the lower arm. Formed in the arm 15 is a smooth bore 17 from which extends a radial slot 18, and formed through the lower arm 16 in axial alignment with said bore is a threaded opening 19.

Rotatably adjustable between the arms 15 and 16 of the fork 12 is a cutter head 20, the body 21 of which is provided with quadrantly spaced cutter rests 22 having angle-shaped cutter seats 23, and removably engaged in said seats are cutters 24. As shown in detail in Figure 4 of the drawings, each of said cutters is provided with a cutting tip 25 of suitable hard cutting metal, and extending rearwardly from the body of the cutter is a stem 26. Formed in the body 21 of the cutter head 20 medially of the vertical faces of the seats 23 are radial openings 27 which snugly receive the stems 26 of the cutters, and adjustable upon the body 21 are set screws 28 disposed to engage said stems for removably securing the cutters in position.

The body 21 of the cutter head 20 is provided at its upper side with an axial socket 29, and at its lower side with a like aligned socket 30. Lying between these sockets is a center wall 31 having a bore 32 therethrough axially of the sockets, and formed through said wall to enter the sockets near the peripheries thereof is an opening 33.

Adjustable in the opening 19 of the arm 16 of the fork 12 is a tail screw 34 secured in adjusted position by a lock nut 35, and formed in the inner end portion of said screw is an axial socket 36. Extending through the bore 32 of the wall 31 of the cutter head 20 is a center post 37 which at its lower end is screwed into the socket 36 of the tail screw 34, while at its upper end said post is formed with a cylindrical head 38 which rotatably fits snugly within the bore 17 of the arm 15 of said fork to effectively support the post at its upper end. The post 37 thus journals the cutter head 20 for rotative adjustment, and, as will be noted, the head 38 is provided with a suitable socket to receive a wrench so that the post may be readily tightened. However, as will be perceived, the post 37 may, by adjusting the tail screw 34, also be tightened from the lower end thereof.

Removably fitting in the socket 29 of the cutter head 20 to more or less snugly surround the center post 37 is a lower ratchet ring 39 provided at its upper side with an annular series of teeth thereon, and fixed to said ring is a depending pin 40 which is received in the upper end of the opening 33 for locking the ring against rotation independently of the cutter head. Removably fitting within the bore 17 of the arm 15 of the fork 12 to more or less snugly surround the post 37 above the ring 39 is a companion upper ratchet ring 41 provided at its lower side with an annular series of teeth thereon to coact with the teeth of the lower ring, and extending radially from the ring 41 is a lug 42 which is slidably received in the slot 18 of the arm 15 and serves to lock the ring 41 against rotation relative to said arm while, however, permitting the upper ring to move axially toward or away from the lower ring.

Formed in the ratchet rings 39 and 41 inwardly of the ratchet teeth thereon are companion annular recesses 43, and received at its ends in said recesses is a coil spring 44 which freely surrounds the post 37 and urges the ring 41 upwardly away from the lower ring 39.

Removably fitting within the socket 30 of the cutter head 20 is a filler ring 45, the smooth bore of which more or less snugly receives the post 37 therethrough. Thus, the rings 39, 41, and 45 will coact with said post and will cooperate to support the cutter head above and below the center wall 31.

As will now be seen, the head 38 of the post 37 will coact with the ratchet ring 41 for normally binding said ring in engagement with the ratchet ring 39, and since the ring 39 is locked to the cutter head 20 by the pin 40 while the ring 41 is locked to the arm 15 of the fork 12 by the lug 42, the cutter head will thus be normally locked solidly against turning movement.

To effect adjustment of the cutter head 20, the post 37 is first loosened, and as the head 38 of the post is thus raised, the spring 44 will raise the ratchet ring 41 to thus automatically disengage said ring from the ratchet ring 39 and free the cutter head. Consequently, the cutter head may then be manually rotated to dispose any one of the cutters 24 in operative forward position, when, by again tightening the post, the head 38 thereof will be caused to shift the ratchet ring 41 axially downward to again engage the ratchet ring 39 for locking the cutter head in adjusted position. The cutter head 20 may thus be easily and quickly set for the operation of any particular cutter desired, and in this connection it is to be noted that the cutters 24 may each be of a different shape and character from the others to serve an individual function, so that all of the cutting operations on a given piece of work may be accomplished through the selective use of the several cutters. As will be perceived, any one of the cutters in use may, by rotatably adjusting the fork 12 on the shank 10, be tilted with respect to the vertical plane of said shank and thus adjustably tilted to engage the work.

Attention is further directed to the fact that the cutter head 20 may be reversed side for side upon the fork 12 to dispose the cutters 24 downwardly. When the cutter head is thus reversed, the ratchet ring 39 will be seated in the socket 30 of the cutter head, while the filler ring 45 will be disposed in the socket 29 of said head. Thus, the ratchet ring 39 will be arranged, in the inverted position of the cutter head, to coact with the ratchet ring 41, while the pin 40 will engage in the end of the opening 33 opposite to that shown in use in Figure 3 of the drawings for locking the ring 39 to the cutter head.

Having thus described my invention, I claim:

1. A cutter tool assembly including a tool holder having a fork provided with spaced arms, an adjustable center post carried by said arms, a cutter head journaled upon said post between the arms and limited against axial movement by said arms, spaced cutters carried by said head, the head being rotatably adjustable to selectively dispose said cutters in operative position, and ratchet mechanism including coacting elements one locked to the head and the other locked to one of said arms but axially slidable thereon and shiftable by axial adjustment of the post for locking the head in adjusted position.

2. A cutter tool assembly including a tool holder, an adjustable center post carried thereby, a cutter head provided at opposite sides thereof with sockets receiving said post therethrough and defining a center wall between the sockets journaling the head upon the post, said wall being provided with an opening therethrough entering the sockets in spaced relation to said post, spaced cutters carried by the head, said head being rotatably adjustable to selectively dispose said cutters in operative position and being reversible side for side upon the holder, a lower ratchet ring surrounding the post in one of said sockets and provided with a pin engaging in one end of said opening and locking the ring to the head, and a companion upper ratchet ring surrounding the post and having a lug thereon engaging the holder to lock the upper ring against rotation but slidable upon the holder to permit axial movement of the upper ring, the upper ring being movable by axial adjustment of said post to coact with the former ring for locking the head in adjusted position, said lower ring being movable to the other of said sockets of the head to engage said pin in the opposite end of said opening when the head is reversed.

3. In a cutter tool assembly, a cutter head having spaced cutters thereon, arms straddling the head, one of said arms being provided with a bore having a slot extending therefrom, an adjustable center post carried by said arms to extend through said bore and journaling the head, said head being adjustably rotatable to selectively dispose said cutters in operative position, a lower ratchet ring surrounding the post and having a pin engaging the head and locking said ring thereto, and a companion upper ratchet ring surrounding the post within said bore and having a lug thereon received in said slot and locking the upper ring to said arm, said lug being slidable in said slot to permit axial movement of the upper ring and the post being axially adjustable for shifting the upper ring axially to coact with the lower ring and lock the head in adjusted position.

References Cited in the file of this patent
UNITED STATES PATENTS

| | | |
|---|---|---|
| 612,155 | Blood | Oct. 11, 1898 |
| 639,892 | Fay | Dec. 26, 1899 |
| 707,472 | Welter | Aug. 19, 1902 |
| 897,576 | Bocorselski | Sept. 1, 1908 |
| 1,115,024 | Rice | Oct. 27, 1914 |
| 1,423,245 | Moore | July 18, 1922 |
| 1,636,167 | Bozsin | July 19, 1927 |
| 1,664,851 | Class | Apr. 3, 1928 |
| 2,202,117 | Muller | May 28, 1940 |
| 2,210,339 | Reinfeld | Aug. 6, 1940 |
| 2,392,216 | Anania | Jan. 1, 1946 |
| 2,547,616 | Beekman | Apr. 3, 1951 |